(12) United States Patent
Ishiuchi

(10) Patent No.: US 10,899,897 B2
(45) Date of Patent: Jan. 26, 2021

(54) RESIN COMPOSITION, CURED PRODUCT THEREOF, AND FRICTION STIR WELDING METHOD

(71) Applicant: SHOWA DENKO K.K., Tokyo (JP)

(72) Inventor: Ryujin Ishiuchi, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 130 days.

(21) Appl. No.: 15/749,181

(22) PCT Filed: Jul. 21, 2016

(86) PCT No.: PCT/JP2016/071399
§ 371 (c)(1),
(2) Date: Jan. 31, 2018

(87) PCT Pub. No.: WO2017/026238
PCT Pub. Date: Feb. 16, 2017

(65) Prior Publication Data
US 2018/0223058 A1 Aug. 9, 2018

(30) Foreign Application Priority Data
Aug. 11, 2015 (JP) .................. 2015-158830

(51) Int. Cl.
*C08J 5/12* (2006.01)
*C08F 283/01* (2006.01)
(Continued)

(52) U.S. Cl.
CPC ............. *C08J 5/121* (2013.01); *B23K 20/122* (2013.01); *B29C 65/0681* (2013.01);
(Continued)

(58) Field of Classification Search
CPC .. B23K 20/12; B23K 20/122; B23K 20/1225; B23K 20/127; B29C 66/112;
(Continued)

(56) References Cited

U.S. PATENT DOCUMENTS 4,290,039 A * 9/1981 Tochizawa ................ H01F 7/10
335/251
4,290,939 A * 9/1981 Bertsch ................... C08G 63/54
523/527
(Continued)

FOREIGN PATENT DOCUMENTS

CN  101213245 A  7/2008
CN  102239027 A  11/2011
(Continued)

OTHER PUBLICATIONS

International Search Report of PCT/JP2016/071399 dated Sep. 13, 2016.
(Continued)

*Primary Examiner* — Michael N Orlando
*Assistant Examiner* — Abhishek A Patwardhan
(74) *Attorney, Agent, or Firm* — Sughrue Mion, PLLC (57) ABSTRACT

A friction stir welding method using a resin composition including: a monomer (A) having an ethylenically unsaturated bond; a thermosetting resin (B); a radical polymerization initiator (C); and a fiber reinforcing material (D), wherein the thermosetting resin (B) is an unsaturated polyester resin or a vinyl ester resin.

11 Claims, 1 Drawing Sheet

(51) Int. Cl.
*C08F 290/06* (2006.01)
*B29C 65/00* (2006.01)
*B29C 65/06* (2006.01)
*B29C 65/82* (2006.01)
*B29C 65/44* (2006.01)
*B32B 15/08* (2006.01)
*B29C 65/64* (2006.01)
*B23K 20/12* (2006.01)
*C08J 5/04* (2006.01)

(52) U.S. Cl.
CPC .......... *B29C 65/44* (2013.01); *B29C 65/645* (2013.01); *B29C 65/8215* (2013.01); *B29C 66/1122* (2013.01); *B29C 66/41* (2013.01); *B29C 66/43* (2013.01); *B29C 66/7394* (2013.01); *B29C 66/73755* (2013.01); *B29C 66/742* (2013.01); *B29C 66/81429* (2013.01); *B29C 66/836* (2013.01); *B32B 15/08* (2013.01); *C08F 283/01* (2013.01); *C08F 290/06* (2013.01); *C08J 5/042* (2013.01); *C08J 5/043* (2013.01); *B29C 66/71* (2013.01); *B29C 66/7422* (2013.01); *B29C 66/939* (2013.01); *C08J 2300/24* (2013.01); *C08J 2329/04* (2013.01); *C08J 2333/06* (2013.01)

(58) Field of Classification Search
CPC . B29C 66/1122; B29C 66/47; B29C 66/5326; B29C 66/41; B29C 66/43; B29C 66/45; B29C 66/73755; B29C 66/7394; B29C 66/7422; B29C 66/74; B29C 66/742; B29C 66/81429; B29C 66/836; B29C 66/70; B29C 66/71; B29C 66/721; B29C 65/44; B29C 65/645; B29C 65/06; B29C 65/0681; B29C 65/64; B29C 65/82; B29C 65/8215; C08J 5/12; C08J 5/121; C08J 5/043; C08J 5/042; C08J 5/047; C08J 5/046; C08J 2300/24
USPC ........................................................ 156/73.5
See application file for complete search history.

(56) References Cited

U.S. PATENT DOCUMENTS

| | | | | |
|---|---|---|---|---|
| 5,447,676 A | * | 9/1995 | Fukuda | .............. C08L 67/06 |
| | | | | 264/331.18 |
| 9,555,580 B1 | * | 1/2017 | Dykstra | ............. B23K 35/0288 |
| 2011/0062287 A1 | * | 3/2011 | Metzech | ........... B29C 66/72141 |
| | | | | 244/133 |
| 2014/0064830 A1 | * | 3/2014 | Nagano | ............... B29C 66/7392 |
| | | | | 403/270 |

FOREIGN PATENT DOCUMENTS

| | | | | |
|---|---|---|---|---|
| CN | 103189472 A | | 7/2013 | |
| DE | 10313611 A1 | * | 10/2004 | ............ B32B 27/08 |
| DE | 10313611 A1 | | 10/2004 | |
| JP | 6-200136 A | | 7/1994 | |
| JP | 2002-86634 A | | 3/2002 | |
| JP | 2002-088176 A | | 3/2002 | |
| JP | 2008-162280 A | | 7/2008 | |
| JP | 2009-279858 A | | 12/2009 | |
| JP | 2010-143009 A | | 7/2010 | |
| JP | 4879474 B2 | | 2/2012 | |
| JP | 2012-170975 A | | 9/2012 | |
| JP | 2013-503602 A | | 2/2013 | |
| JP | 2013-209510 A | | 10/2013 | |
| JP | 2014-208461 A | | 11/2014 | |
| JP | 2015-131443 A | | 7/2015 | |
| JP | 2015-131444 A | | 7/2015 | |
| WO | 2011/027901 A1 | | 3/2011 | |
| WO | 2014/051029 A1 | | 4/2014 | |

OTHER PUBLICATIONS

Communication dated May 7, 2019, from the State Intellectual Property Office of People's Republic of China in counterpart Application No. 201680045223.7.
Partial Supplementary Search Report dated Mar. 29, 2019 issued by the European Patent Office in counterpart application No. 16834935.5.
Communication dated Feb. 4, 2020 from Japanese Patent Office in JP Application No. 2017-534153.

* cited by examiner

RESIN COMPOSITION, CURED PRODUCT THEREOF, AND FRICTION STIR WELDING METHOD

TECHNICAL FIELD

The present invention relates to a resin composition, a cured product thereof, and a friction stir welding method.

Priority is claimed on Japanese Patent Application No. 2015-158830, filed Aug. 11, 2015, the content of which is incorporated herein by reference.

BACKGROUND ART

Compositions containing an unsaturated polyester resin, in particular, a sheet molding compound (hereinafter referred to as "SMC") and a bulk molding compound (hereinafter referred to as "BMC") are thermosetting resin compositions that can be formed into a desired shape and can also provide a cured product excellent in dimensional accuracy and mechanical properties. For this reason, thermosetting resin composite materials such as SMC and BMC have been used as structural members and outer plates which are used in various fields.

SMC and BMC are sometimes used in combination with a metal from the viewpoint of mechanical strength. In general, as a method of joining the members of SMC, BMC and metals to each other, a physical joining method in which members are fitted to each other and a chemical joining method in which members are joined to each other using an adhesive have been used. However, since these joining methods require a joining step that enables the above joining process, there are problems in that the number of steps to be used increases and the manufacturing cost increases (for example, see Patent Documents 1 and 2).

On the other hand, a thermoplastic resin composite material containing a thermoplastic resin, like the thermosetting resin, can be molded into a desired shape, and can also be joined by friction stir welding by means such as heat sealing (for example, refer to Patent Document 3).

CITATION LIST

[Patent Document 1] Japanese Unexamined Patent Application, First Publication No. 2010-143009
[Patent Document 2] Published Japanese Translation No. 2013-503602 of the PCT International Publication
[Patent Document 3] Japanese Unexamined Patent Application, First Publication No. 2008-162280

DISCLOSURE OF INVENTION

Problem to be Solved by the Invention

However, the thermoplastic resin composite material has problems in that the initial rigidity is low and the temperature dependency of the mechanical strength is great.

On the other hand, in thermosetting resin composite materials, since the resin serving as a base is thermosetting, it is thought that already cured composite materials cannot be joined through friction stir welding that joins by means of frictional heat.

The present invention has been made in order to solve the above problems, and has an object of providing a resin composition which is a thermosetting resin composite material having high mechanical strength and low temperature dependency; and a cured product thereof; wherein the composite material or the cured product thereof can be efficiently joined with a metal material by friction stir welding; and a friction stir welding method using the cured product.

Means for Solving the Problem

As a result of extensive studies in order to solve the above problems, the inventors of the present invention have found that by using a monomer having an ethylenically unsaturated bond (component (A)) and a thermosetting resin including an unsaturated polyester resin or a vinyl ester resin (component (B)) in combination, a thermosetting resin composite material can be joined with a member such as a metal by friction stir welding, which has led to the completion of the present invention.

The present invention can provide a resin composition that can be favorably used for friction stir welding; a cured product thereof; and a method for producing a joined body of a cured product and a member, that is, a friction stir welding method of a cured product and a member. The friction stir welding method of the present invention can also be considered as a method for producing a joined body of a cured product and a member.

That is, a first aspect of the present invention is the following friction stir welding method.

[1]
A friction stir welding method including:
(i) preparing a cured product and a member to be joined to the cured product;
(ii) bringing the aforementioned cured product into contact with the aforementioned member to form a contact portion; and
(iii) pressing, while rotating, a cylindrical tool against at least a part of the aforementioned member, and joining the aforementioned cured product and the member by means of frictional heat due to friction and agitation,
wherein the aforementioned cured product is a cured product of a resin composition including a monomer (A) having an ethylenically unsaturated bond, an unsaturated polyester resin or a vinyl ester resin (13), a radical polymerization initiator (C), and a fiber reinforcing material (D).

The friction stir welding method of the present invention preferably has the following characteristics.
[2]. The aforementioned member is a metal member.
[3]. In [1] or [2], the aforementioned fiber reinforcing material (D) is a carbon fiber.
[4]. In any one of [1] to [3], a residual amount of the aforementioned monomer (A) having an ethylenically unsaturated bond which is remaining in an unreacted state in the cured product is from 0.1% by mass to 1% by mass with respect to the total amount of the aforementioned resin composition.
[5]. In any one of [1] to [4], in the aforementioned resin composition,
an amount of the monomer (A) having an ethylenically unsaturated bond is from 20% by mass to 80% by mass with respect to the total amount of the monomer (A) having an ethylenically unsaturated bond and the thermosetting resin (B),
an amount of the radical polymerization initiator (C) is from 0.1 parts by mass to 15 parts by mass with respect to a total of 100 parts by mass of the monomer (A) having an ethylenically unsaturated bond and the thermosetting resin (B), and
an amount of the fiber reinforcing material (D) is from 5 parts by mass to 120 parts by mass with respect to a total of 100 parts by mass of the monomer (A) having an ethylenically unsaturated bond and the thermosetting resin (B).

[6]. In any one of [1] to [5], the aforementioned fiber reinforcing material (D) is a fiber cut to a length of 25 mm or less.

[7]. In any one of [1] to [6], the aforementioned fiber reinforcing material (D) is a glass mat or a glass cloth.

A second aspect of the present invention is a structure described below.

[8]. A structure obtained by joining the aforementioned cured product and the aforementioned member by the friction stir welding method according to any one of [1] to [7].

A third aspect of the present invention is a resin composition described below.

[9]. A resin composition for friction stir welding, wherein the resin composition including:

a monomer (A) having an ethylenically unsaturated bond;

a thermosetting resin (B);

a radical polymerization initiator (C); and a fiber reinforcing material (D), and the aforementioned thermosetting resin (B) is an unsaturated polyester resin or a vinyl ester resin.

Effects of Invention

According to the present invention, it is possible to provide a thermosetting resin composite material having high mechanical strength and small temperature dependency, that is, independent of ambient temperature. A cured product of the thermosetting resin composite material and a material or member composed of a metal or the like can be joined more efficiently by friction stir welding. The present invention can provide an excellent resin composition, a cured product thereof, and a friction stir welding method.

BEST MODE FOR CARRYING OUT THE INVENTION

Preferred embodiments of a resin composition, a cured product thereof and a friction stir welding method of the present invention will be described.

It should be noted that the present embodiment is specifically explained for better understanding of the scope of the invention, and does not limit the present invention unless otherwise specified. Modifications, omissions, exchanges and/or additions can be made as necessary within the scope of the present invention.

[Friction Stir Welding]

Figure 1:
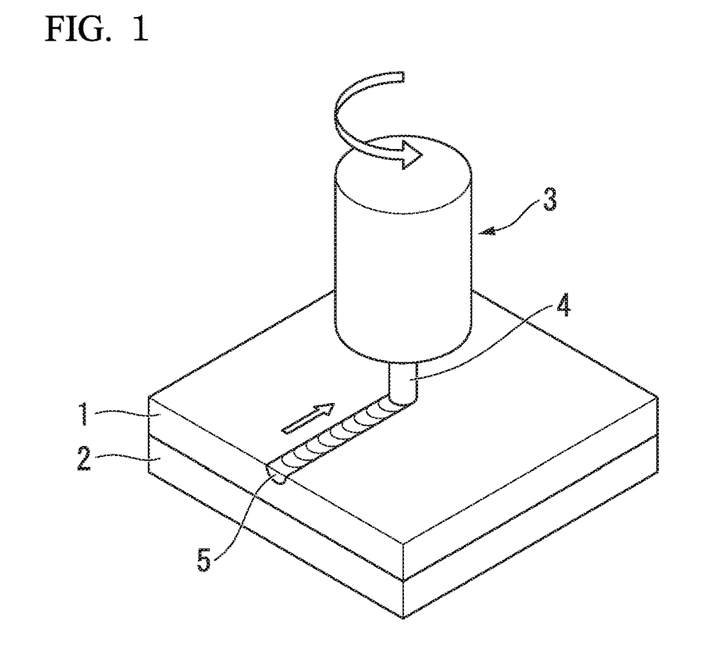
FIG. 1 is a schematic view showing a preferred example of friction stir welding of the present invention.

Friction stir welding which can be used in the present invention is a joining method in which a cylindrical tool is used, and while rotating it, a small protruding portion present at the tip of the tool and having a cylindrical cross section is pressed, for example, on the abutting surface of two members or on the surface of one of two members overlapping each other vertically with a strong force (see FIG. 1 as a preferred example). By moving the cylindrical tool or the member while maintaining the above state, the joining area can be increased. As a specific example, the tip portion of the cylindrical tool is pushed into the joining portion of a member to be joined and another member (base material) to generate frictional heat to soften the members, while the periphery of the joining portion is allowed to undergo plastic flow to be kneaded and mixed by the rotating force of the tool, thereby integrating the plurality of members. For example, when a laminate of two members such as a cured resin material and a member is joined, the frictional heat is transmitted further downward from the recessed portion (press-fit mark), and the cured resin material and the member can be joined. The cylindrical tool preferably has a protruding portion at its tip, and it is common to carry out a joining process so that the protruding portion completely enters the contact portion of the member. Although the shape of the protruding portion can be arbitrarily selected, it may be a cylindrical shape, a truncated cone shape, or the like, and it may be threaded or the like. The size of the protruding portion can also be arbitrarily selected. The member to be joined can be arbitrarily selected, but a metal member is preferable. In particular, a metal having a melting temperature of 500° C. or higher is more preferable. Examples of the metal member having a melting temperature of 500° C. or higher include aluminum, an aluminum alloy, and the like.

Examples of joining conditions include the shape of the cylindrical tool (rotating tool), the size of the distal end face, the rotational speed, the moving speed, the inclination angle of the axis with respect to the normal line of the surface of the member to be joined, and the like. These can be arbitrarily set depending on the member to be joined, and the type, the thickness and the like of material of the resin member (cured product) formed from the thermosetting resin composition.

As a rotating tool for friction stir welding, it is also possible to use either one having a pin-like probe (protruding portion) at the tip portion of the tool or one obtained by removing the pin-like probe. Among these, a tool having a pin-like probe is preferred because it increases the joining strength.

The diameter D of the distal end face of the rotating tool preferably satisfies the relationship of $5t \leq D \leq 20t$, where t is the thickness of the member to be joined, because the joining strength can be increased. For example, when the member to be joined is 2 mm, the diameter D is preferably from 10 mm to 40 mm.

For the pin-like probe, it is preferable that the tip diameter d satisfies the relationship of $0.5t \leq d \leq 5t$ because the joining strength can be increased.

The rotational speed of the rotating tool is preferably from 1,000 revolutions/min to 5,000 revolutions/min from the viewpoint of joining strength. The joining speed (that is, the moving speed of the rotating tool) is preferably from 200 mm/min to 1,000 mm/min from the viewpoint of joining strength.

The inclination angle θ of the axis of the rotating tool with respect to the normal line of the surface of the member to be joined is preferably $0° < \theta < 5°$ because the joining strength can be increased. This inclination angle θ corresponds to the "angle of advance" in the technical field of friction stir welding.

[Resin Composition]

A resin composition that can be preferably used for friction stir welding of the present invention includes a monomer (A) having an ethylenically unsaturated bond, a thermosetting resin (B), a radical polymerization initiator (C), a fiber reinforcing material (D), and the thermosetting resin (B) is an unsaturated polyester resin or a vinyl ester resin.

"Monomer (A) Having an Ethylenically Unsaturated Bond"

The monomer having an ethylenically unsaturated bond is a compound having an ethylenic carbon-carbon double bond, and it is selected as required and is not particularly limited.

Examples of the compound containing an ethylenically unsaturated group include a monofunctional monomer and a polyfunctional monomer.

The monofunctional monomer can be arbitrarily selected, and examples thereof include styrene, vinyltoluene, methylstyrene and methyl methacrylate. Any one of these monofunctional monomers may be used alone, or two or more of these monofunctional monomers may be used in combination. It is preferably styrene.

The polyfunctional monomer can be arbitrarily selected and examples thereof include ethylene glycol di(meth)acrylate, diethylene glycol di(meth)acrylate, polyethylene glycol #200 (#400, #600) di(meth)acrylate, 1,4-butanediol di(meth)acrylate, 1,6-hexanediol di(meth)acrylate, 1,9-nonanediol (meth)acrylate, trimethylolpropane (meth)acrylate, glycerin di(meth)acrylate, 2-hydroxy-3-acryloyloxypropyl (meth) acrylate, triethylene glycol di(meth)acrylate, polyethylene glycol di(meth)acrylate, neopentyl glycol di(meth)acrylate, 1,3-butanediol di(meth)acrylate and 1,10-decanediol di(meth)acrylate. Any one of these polyfunctional monomers may be used alone, or two or more of these polyfunctional monomers may be used in combination.

It should be noted that in the present specification, the term "(meth)acrylate" means methacrylate or acrylate. It is preferably ethylene glycol di(meth)acrylate or trimethylolpropane tri(meth)acrylate.

The added amount of the monomer (A) having an ethylenically unsaturated bond in the resin composition of the present invention is preferably from 20% by mass to 80% by mass, more preferably from 25% by mass to 70% by mass, and still more preferably from 30% by mass to 60% by mass, with respect to the total amount of the monomer (A) having an ethylenically unsaturated bond and the thermosetting resin (B).

When the added amount of the monomer (A) having an ethylenically unsaturated bond is 20% by mass or more, the viscosity of the resin composition is within an appropriate range, and the workability at the time of molding is improved. On the other hand, if the added amount of the monomer (A) having an ethylenically unsaturated bond is 80% by mass or less, a cured product of a resin composition having desired physical properties can be obtained.

It should be noted that although the total amount of the monomer (A) having an ethylenically unsaturated bond and the thermosetting resin (B) in the resin composition of the present invention can be arbitrarily selected, for example, it is preferably from 20% by mass to 80% by mass, more preferably from 30% by mass to 70% by mass, and still more preferably from 40% by mass to 60% by mass.

"Thermosetting Resin (B)"

The thermosetting resin (B) can be arbitrarily selected, and an unsaturated polyester resin or a vinyl ester resin is preferably used. It should be noted that the unsaturated polyester resin and the vinyl ester resin referred to here are those in an uncured state.

The unsaturated polyester resin is not particularly limited and can be arbitrarily selected, and it is possible to use a known material used as a molding material in the technical field of the present invention.

Further, the thermosetting resin (B) may contain the above-mentioned monomer (A) having an ethylenically unsaturated bond as a material.

In general, the unsaturated polyester resin is a compound obtained by polycondensation (esterification) of a polyhydric alcohol and an unsaturated polybasic acid or a saturated polybasic acid. It should be noted that a vinyl ester resin may be used as a part of the unsaturated polyester resin as long as the effect of the present invention is not impaired. That is, an unsaturated polyester resin and a vinyl ester resin may be used in combination. The amount ratio can be selected arbitrarily, and a ratio of unsaturated polyester resin: vinyl ester resin=80:20 to 20:80, more preferably 75:15 to 50:50 and the like can be mentioned.

The weight average molecular weight (MW) of the unsaturated polyester resin can be arbitrarily selected and is not particularly limited. For example, the weight average molecular weight (MW) is preferably from 2,000 to 50,000, and more preferably from 5,000 to 20,000.

When the weight average molecular weight of the unsaturated polyester resin is within the above range, sufficient properties such as strength and electrical properties for the cured product can be obtained.

It should be noted that in the present specification, the term "weight average molecular weight" means a value measured at normal temperature under the following conditions using gel permeation chromatography (product name: Shodex (registered trademark) GPC-101, manufactured by Showa Denko K.K.), and obtained using a standard polystyrene calibration curve.

Column: product name: LF-804, manufactured by Showa Denko K.K.

Column temperature: 40° C.

Sample: a 0.2% by mass tetrahydrofuran solution of the copolymer

Flow rate: 1 mL/min

Eluent: tetrahydrofuran

Detector: RI-71S

The polyhydric alcohol used for the synthesis of the unsaturated polyester is not particularly limited and can be arbitrarily selected, and a known polyhydric alcohol can be used.

Examples of the polyhydric alcohol include ethylene glycol, propylene glycol, butanediol, diethylene glycol, dipropylene glycol, triethylene glycol, pentanediol, hexanediol, neopentanediol, hydrogenated bisphenol A, bisphenol A and glycerin. Any one of these polyhydric alcohols may be used alone, or two or more of these polyhydric alcohols may be used in combination.

The unsaturated polybasic acid used for the synthesis of the unsaturated polyester is not particularly limited and can be arbitrarily selected, and a known unsaturated polybasic acid can be used.

Examples of the unsaturated polybasic acid include maleic anhydride, fumaric acid, citraconic acid and itaconic acid. Any one of these unsaturated polybasic acids may be used alone, or two or more of these unsaturated polybasic acids may be used in combination.

The saturated polybasic acid used for the synthesis of the unsaturated polyester is not particularly limited and can be arbitrarily selected, and a known saturated polybasic acid can be used.

Examples of the saturated polybasic acid include phthalic anhydride, isophthalic acid, terephthalic acid, HET acid, succinic acid, adipic acid, sebacic acid, tetrachlorophthalic anhydride, tetrabromophthalic anhydride and endomethylene tetrahydrophthalic anhydride. Any one of these saturated polybasic acids may be used alone, or two or more of these saturated polybasic acids may be used in combination.

The unsaturated polyester can be synthesized by a known method using the above-mentioned raw materials.

Various conditions for the synthesis of the unsaturated polyester are appropriately set according to the raw materials used and the amount thereof. In general, esterification may be carried out under pressure or under reduced pressure at a temperature of 140° C. to 230° C. in an inert gas stream such as nitrogen. In this esterification reaction, a catalyst can be used, if necessary.

The catalyst can be arbitrarily selected, and examples thereof include known catalysts such as manganese acetate, dibutyltin oxide, stannous oxalate, zinc acetate and cobalt acetate. Any one of these catalysts may be used alone, or two or more of these catalysts may be used in combination.

The vinyl ester resin can be arbitrarily selected, and preferred examples thereof include epoxy (meth)acrylate obtained by esterifying an epoxy resin and an α,β-unsaturated monocarboxylic acid by a known method.

Examples of the epoxy resin used for the synthesis of the vinyl ester resin include bisphenol A, bisphenol AD, bisphenol F and diglycidyl ethers of bisphenol and high molecular weight homologues thereof; phenol novolac-type polyglycidyl ethers and cresol novolac-type polyglycidyl ethers. Further, in the synthesis process, those obtained by reacting phenols such as bisphenol A, bisphenol AD, bisphenol F and bisphenol S with these glycidyl ethers or an aliphatic epoxy resin may be used.

The α,β-unsaturated monocarboxylic acid used for the synthesis of the vinyl ester resin can be selected arbitrarily, and acrylic acid, methacrylic acid and the like can be generally mentioned. In addition, as the α,β-unsaturated monocarboxylic acid, crotonic acid, tiglic acid, cinnamic acid and the like can also be used.

The vinyl ester resin can be synthesized, for example, by esterifying the glycidyl ether of the above bisphenols with the α,β-unsaturated monocarboxylic acid at a ratio of (carboxyl group)/(epoxy group)=1.05 to 0.95 at 80° C. to 140° C. Furthermore, if necessary, a catalyst can be used.

Examples of the catalyst include tertiary amines such as benzyldimethylamine, triethylamine, N,N-dimethylaniline, triethylenediamine and 2,4,6-tris(dimethylaminomethyl) phenol, quaternary ammonium salts such as trimethylbenzylammonium chloride, and metal salts such as lithium chloride.

In addition to the above-mentioned vinyl ester resin composed of epoxy (meth)acrylate, as the vinyl ester resin, for example, a resin obtained by reacting at least one of a saturated dicarboxylic acid and an unsaturated dicarboxylic acid with a saturated polyester resin or an unsaturated polyester of a terminal carboxyl group obtained from a polyhydric alcohol, and a polyester (meth)acrylate or acrylic ester resin of a saturated polyester resin or unsaturated polyester resin obtained by reacting a bisphenol such as bisphenol A, bisphenol AD, bisphenol F and bisphenol S with an α,β-unsaturated monocarboxylic acid derivative having an epoxy group, can also be used.

Bisphenols can be arbitrarily selected, and examples thereof include bisphenol A, bisphenol AD, bisphenol F, bisphenol S, bisphenol novolac and cresol novolac.

Examples of the α,β-unsaturated monocarboxylic acid derivative having an epoxy group include glycidyl acrylate, glycidyl methacrylate, and the like.

Further, as the saturated dicarboxylic acid, the unsaturated dicarboxylic acid, and the polyhydric alcohol, the same as those exemplified as the raw material components of the above unsaturated polyester can be used.

In the present invention, it is preferable to dissolve the above unsaturated polyester resin or the vinyl ester resin in the monomer (A) having an ethylenically unsaturated bond for use.

"Radical Polymerization Initiator (C)"

The radical polymerization initiator is used as a curing agent. The radical polymerization initiator can be arbitrarily selected and is not particularly limited, and a radical polymerization initiator known in the technical field of the present invention can be used. As the radical polymerization initiator, for example, organic peroxides such as t-butylperoxy-2-ethylhexanoate, t-hexylperoxy-2-ethylhexanoate, 1,1,3,3-tetramethylbutylperoxy-2-ethyl hexanoate, benzoyl peroxide, 1,1-di-t-butylperoxycyclohexane, 1,1-di-t-hexylperoxycyclohexane, 1,1-di-t-butylperoxy-3,3,5-trimethyl cyclohexane, t-butyl peroxy isopropyl carbonate, t-hexyl peroxy isopropyl carbonate, t-butyl peroxybenzoate, t-hexyl peroxy benzoate, 1,6-bis(t-butyl peroxycarbonyloxy) hexane, dicumyl peroxide and di-t-butyl peroxide can be mentioned. Any one of these radical polymerization initiators may be used alone, or two or more of these radical polymerization initiators may be used in combination.

Further, in the resin composition of the present invention, a curing accelerator can also be used in addition to the radical polymerization initiator. Examples of the curing accelerator include cobalt naphthenate and the like.

The added amount of the radical polymerization initiator (C) in the resin composition of the present invention is preferably from 0.1 parts by mass to 15 parts by mass, and more preferably from 2 parts by mass to 8 parts by mass with respect to a total of 100 parts by mass of the monomer (A) having an ethylenically unsaturated bond and the thermosetting resin (B).

When the added amount of the radical polymerization initiator (C) is 0.1 parts by mass or more, the curing time of the resin composition is short and the curing is sufficient. On the other hand, if the added amount of the radical polymerization initiator (C) is 15 parts by mass or less, the storage stability of the resin composition can be obtained.

"Fiber Reinforcing Material (D)"

The fiber reinforcing material can be arbitrarily selected. Preferable examples include various organic fibers and inorganic fibers such as a glass fiber, a pulp fiber, a Tetoron (registered trademark) fiber, a vinylon fiber, a carbon fiber, an aramid fiber and wollastonite. Of these, a glass fiber and a carbon fiber are preferable in terms of handling properties and mechanical strength of the cured product.

As the fiber reinforcing material, it is preferable to use a fiber cut to a length of 25 mm or less.

When the fiber length of the fiber reinforcing material is 25 mm or less, the fluidity of the resin composition in a mold is not impaired. Alternatively, a cloth obtained by weaving fiber reinforcing materials or an aggregate of fiber reinforcing materials, such as glass mats or glass cloths, for example, a cloth or an aggregate such as glass mats or glass cloths with a basis weight of 300 g/m$^2$ to 700 g/m$^2$ can also be preferably used. When the basis weight is 300 g/m$^2$ or more, a desired strength is obtained, and if it is 700 g/m$^2$ or less, the occurrence of reinforcing materials such as glass that have not been impregnated with the resin can be prevented, and desired characteristics can be obtained.

The added amount of the fiber reinforcing material (D) in the resin composition of the present invention is preferably from 5 parts by mass to 120 parts by mass, more preferably from 10 parts by mass to 110 parts by mass, and still more preferably from 20 parts by mass to 50 parts by mass with respect to a total of 100 parts by mass of the monomer (A) having an ethylenically unsaturated bond and the thermosetting resin (B).

If the added amount of the fiber reinforcing material (D) is 5 parts by mass or more, sufficient strength can be obtained for the cured product.

On the other hand, if the added amount of the fiber reinforcing material (D) is 120 parts by mass or less, the fiber reinforcing material (D) will be sufficiently impregnated with the monomer (A) having an ethylenically unsaturated bond and the thermosetting resin (B).

"Other Components"

From the viewpoint of improving various physical properties, the resin composition of the present invention may contain optional components such as a filler, a low profile agent, a mold release agent, a thickener and a pigment, if necessary.

The types of the filler, the low profile agent, the mold release agent, the thickener and the pigment are not particularly limited, but those that are known in the technical field of the present invention can be used.

Examples of the filler include inorganic fillers such as calcium carbonate, barium sulfate, talc, silica, hollow fillers, aluminum hydroxide, magnesium carbonate, aluminum oxide, magnesium oxide, beryllium oxide, aluminum nitride, boron nitride, titanium nitride, silicon carbide, boron carbide, titanium carbide and titanium boride. Any one of these fillers may be used alone, or two or more of these fillers may be used in combination.

The average primary particle size of the filler can be arbitrarily selected. From the viewpoint of uniformly dispersing in the resin composition, it is preferably from 0.5 μm to 30 μm, and more preferably from 1 μm to 20 μm.

Further, the shape of the filler is preferably amorphous or a spherical powder. Although the amount of the filler can be arbitrarily selected, it can be, for example, from 3 to 30% by mass, and preferably from 5 to 25% by mass, with respect to the total amount of the composition.

Examples of the low profile agent include thermoplastic polymers generally used as a low profile agent such as polystyrene, polymethyl methacrylate, polyvinyl acetate, saturated polyesters and styrene-butadiene rubber. Any one of these low profile agents may be used alone, or two or more of these low profile agents may be used in combination.

Further, from the viewpoints of low shrinkage and melting point, it is preferable to use polystyrene or polymethyl methacrylate as the low profile agent, and from the viewpoint of reaction point with an unsaturated polyester or a vinyl ester, diene-based rubber is preferably used. Although the amount of the low profile agent can be arbitrarily selected, it can be, for example, from 0.0 to 10% by mass, and preferably from 0.0 to 7% by mass, with respect to the total amount of the composition.

Examples of the mold release agent include stearic acid, zinc stearate, calcium stearate, aluminum stearate, magnesium stearate and carnauba wax. Although the amount of the mold release agent can be arbitrarily selected, it can be, for example, from 0.0% by mass to 7% by mass, and preferably from 0.5% by mass to 5% by mass, with respect to the total amount of the composition.

Examples of the thickener include metal oxides such as magnesium oxide, magnesium hydroxide, calcium hydroxide and calcium oxide, and isocyanate compounds. Any one of these thickeners may be used alone, or two or more of these thickeners may be used in combination. Although the amount of the thickener can be arbitrarily selected, it can be, for example, from 0.0% by mass to 5% by mass, and preferably from 0.3% by mass to 3% by mass, with respect to the total amount of the composition.

It should be noted that the added amount of the above optional components is not particularly limited as long as it is within a range that does not impair the effects of the present invention.

According to the resin composition of the present invention, since the monomer (A) having an ethylenically unsaturated bond and the thermosetting resin (B) composed of an unsaturated polyester resin or a vinyl ester resin are used in combination, a thermosetting resin composite material having high mechanical strength and low temperature dependency can be joined by friction stir welding.

Further, according to the resin composition of the present invention, a cured product composed of a resin composition for friction stir welding can be produced with excellent workability and productivity.

[Method for Producing Resin Composition]

The resin composition of the present invention is obtained by uniformly dispersing the monomer (A) having an ethylenically unsaturated bond, the thermosetting resin (B), the radical polymerization initiator (C) and the fiber reinforcing material (D).

The method for uniformly dispersing the monomer (A) having an ethylenically unsaturated bond, the thermosetting resin (B), the radical polymerization initiator (C) and the fiber reinforcing material (D) is not particularly limited as long as it is a method capable of uniformly dispersing these components, and for example, a method using a disper or a double arm type kneader can be mentioned.

The method for producing the resin composition can be arbitrarily selected, and examples thereof include the following method. The thermosetting resin (B) is dissolved in the monomer (A) having an ethylenically unsaturated bond. Thereafter, the radical polymerization initiator (C) and the fiber reinforcing material (D) are added to the resulting solution, and the above optional components are added, as necessary, and further dispersed or dissolved.

[Cured Product]

The cured product of the present invention is obtained by curing the resin composition of the present invention. The curing temperature and method can be arbitrarily selected depending on the composition. A method of curing at a temperature of, for example, 5 to 180° C., and the like can be mentioned, and a temperature of 120° C. to 170° C. and the like can also be preferably selected as necessary.

More specifically, the cured product of the present invention can be obtained by injecting the resin composition of the present invention into a mold such as a die and curing the resin composition of the present invention under pressure at a temperature of, for example, 5 to 180° C. It may be considered as a pressed and heated molded article.

In the case of forming, and then curing, a resin composition by hand lay up molding, it is preferable to impregnate the fiber reinforcing material (D) composed of a glass mat or glass cloth with a mixture of the monomer (A) having an ethylenically unsaturated bond, the thermosetting resin (B) and the radical polymerization initiator (C) at normal temperature and under normal pressure to obtain the resin composition of the present invention, followed by curing. The resin composition may be handled as an intermediate product which is not completely cured. In order to sufficiently bring out the properties of the cured product, after curing or after pressurizing and curing, post-curing may be further carried out at 60° C. to 120° C.

In the cured product of the present invention, the residual amount of the monomer (A) having an ethylenically unsaturated bond and remaining in an unreacted state is preferably from 0.1% by mass to 1% by mass, more preferably from 0.15% by mass to 0.7% by mass, and still more preferably from 0.2% by mass to 0.5% by mass with respect to the total amount of the resin composition. The residual amount of the monomer can be measured, for example, by the measuring method described in the examples.

When the residual amount of the monomer having an ethylenically unsaturated bond is 0.1% by mass or more, it is preferable since a sufficient joining force can be obtained at the time of joining. On the other hand, when the residual amount of the monomer having an ethylenically unsaturated bond is 1% by mass or less, it is preferable since troubles such as deformation of the cured product due to the stress of the tool (rotating tool) do not occur at the time of joining.

Since the cured product of the present invention is obtained by curing the resin composition of the present invention, it has high mechanical strength and excellent dimensional stability.

EXAMPLES

Hereinafter, the present invention will be described more specifically with reference to Examples and Comparative Examples, although the present invention is not limited to the following Examples.

Various physical properties in the following Examples and Comparative Examples were evaluated as follows.
(1) Measurement of Residual Amount of Styrene Monomer 1 g of a cured product was scraped out from the molded article (cured product) obtained by a method described later and placed in a screw tube, and dimethylformamide was added thereto so that the weight sum of the cured product and dimethylformamide was 10 g, and the resulting mixture was left to stand at 23° C. for 24 hours. A residual monomer in the obtained cured product was extracted with dimethylformamide. After filtrating the dimethylformamide as an extracting agent, 1 μL of the filtrate was collected and the residual amount of styrene monomer was measured by gas chromatography (GC) using GC-14B (product name, manufactured by Shimadzu Corporation).

A calibration curve was prepared in advance using the styrene monomer used in the thermosetting resin composition. Using the calibration curve, the residual amount of the styrene monomer detected from the filtrate was determined. The residual amount (% by mass) of the styrene monomer in the cured product was calculated by the formula: (residual amount (mass) of styrene monomer)/(amount (mass) of cured product scraped out)×100(%).
(2) Joinability Evaluation:

After joining a metal member and a resin member as described later, the strength of the joint portion between the metal member and the resin member was measured in accordance with the tensile shear test (JIS-K6850: 1999). It was evaluated as "D (poor)" when the breaking strength was less than 2 MPa, "C (fair)" when the breaking strength was from 2 MPa to 4 MPa, "B (good)" when the breaking strength was from 4 MPa to 10 MPa, and "A (excellent)" when the breaking strength was 10 MPa or more.
(3) Deformation Evaluation of Molded Articles The molded article obtained in the examples by joining the metal member and the resin member was visually observed, and when there was no crack in the molded article, it was evaluated that cracks were "absent", and it was evaluated that cracks were "present" when the molded article had cracks.

Example 1

A thermosetting resin composition used in Example 1 was obtained by uniformly kneading, using a double arm type kneader, 40 parts by mass of a styrene monomer, 60 parts by mass of a bisphenol A type vinyl ester resin (product name: Ripoxy (registered trademark) R-802, manufactured by Showa Denko K.K.) having a styrene monomer content of 30% by mass, 1 part by mass of t-butyl peroxybenzoate (hereinafter abbreviated as "TBPO", product name: PER-BUTYL (registered trademark) Z, manufactured by NOF CORPORATION) as a radical polymerization initiator, 15 parts by mass of calcium carbonate (product name: KS-1200A, average particle size: 1.2 μm, manufactured by Dowa Calfine Co., Ltd.) as a filler, 1 part by mass of magnesium oxide, 2 parts by mass of zinc stearate, and 110 parts by mass of a carbon fiber (manufactured by Toray Industries, Inc.) as a fiber reinforcing material.

The obtained thermosetting resin composition was molded by heating and press molding at a molding temperature of 150° C., a molding pressure of 10 MPa and a molding time of 180 seconds using a die having a size of 320 mm×220 mm×15 mm to produce a molded article of Example 1 (cured product, 320 mm (length)×220 mm (width)×2 mm (thickness)).

A piece having a size of 100 mm (length)×25 mm (width)×2 mm (thickness) was cut out from the molded article, and the residual amount of the styrene monomer was measured according to the above evaluation method (1) using the remaining cutout.

Figure 2:
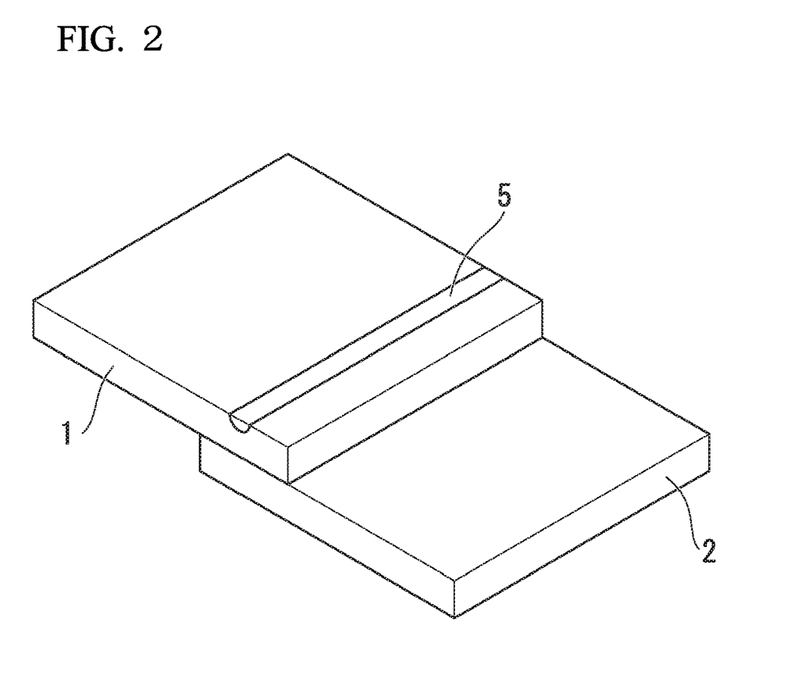
FIG. 2 is a schematic view showing a method for evaluating joinability in Examples.

An aluminum plate (A6060, 100 mm×25 mm×1 mm) was selected as a member to be joined to the cut molded article. As shown in FIG. 2, the molded article and the aluminum plate were superposed with a width of 12.5 mm and joined by friction stir welding under the following conditions to obtain a test specimen.

As the rotating tool, a tool having a pin-like probe (protruding portion) at the tip portion of the tool and having a diameter D of the distal end face of the rotating tool of 15 mm and a tip diameter d of the pin-like probe of 1 mm was used. The rotational speed of the rotating tool was set at 1,000 revolutions/min, the moving speed of the probe was set at 200 mm/min, and the inclination angle θ of the axis with respect to the normal line of the surface of the member to be joined was set at 1°.

For the obtained test specimen (joined body), joinability and deformation of the molded article were evaluated in accordance with the above evaluation methods (2) and (3). The results are shown in Table 1.

Example 2

A thermosetting resin composition used in Example 2 was obtained by uniformly kneading, using a double arm type kneader, 40 parts by mass of a styrene monomer, 60 parts by mass of an unsaturated polyester resin A (product name: Rigolac (registered trademark) M-500D, manufactured by Showa Denko K.K.) having a styrene monomer content of 30% by mass, 10 parts by mass of polystyrene, 1 part by mass of TBPO as a radical polymerization initiator, 15 parts by mass of calcium carbonate (product name: KS-1200A, average particle size: 1.2 μm, manufactured by Dowa Calfine Co., Ltd.) as a filler, 1 part by mass of magnesium oxide, 2 parts by mass of zinc stearate, and 100 parts by mass of a carbon fiber (manufactured by Toray Industries, Inc.) as a fiber reinforcing material.

Next, a molded article was produced and evaluated in the same manner as in Example 1. The results are shown in Table 1.

Examples 3 to 4

Molded articles were produced and evaluated in the same manner as in Example 1 except that the compositions shown in Table 1 were employed. The results are shown in Table 1.

Example 5

100 parts by mass of an unsaturated polyester resin B (product name: Rigolac 158 BQTN, manufactured by Showa Denko K.K.) having a styrene monomer content of 30% by mass, 1 part by mass of methyl ethyl ketone peroxide as a radical polymerization initiator, and 0.1 parts by mass of 5% cobalt naphthenate as a curing accelerator were uniformly dispersed with a disper. Thereafter, 60 parts by mass of a glass mat (basis weight: 450 g/m$^2$, manufactured by Nitto Boseki Co., Ltd.) as a fiber reinforcing material were impregnated by hand lay up molding and allowed to stand at 23° C. for 24 hours, and then a molded article of Example 5 was produced, and the evaluation was carried out in the same manner as in Example 1. The results are shown in Table 1.

Example 6

After producing a molded article in the same manner as in Example 5, the molded article was further cured at 120° C. for 2 hours.

The obtained molded article was evaluated in the same manner as in Example 1. The results are shown in Table 1.

Example 7

A thermosetting resin composition of Example 7 was obtained by uniformly kneading, using a double arm type kneader, 18 parts by mass of a styrene monomer, 82 parts by mass of an unsaturated polyester resin A (product name: Rigolac (registered trademark) M-500D, manufactured by Showa Denko K.K.) having a styrene monomer content of 30% by mass, 10 parts by mass of polystyrene, 1 part by mass of TSPO as a radical polymerization initiator, 50 parts by mass of calcium carbonate (product name: KS-1200A, average particle size: 1.2 μm, manufactured by Dowa Calfine Co., Ltd.) as a filler, 1 part by mass of magnesium oxide, 2 parts by mass of zinc stearate, and 10 parts by mass of a glass fiber (manufactured by Nippon Electric Glass Co., Ltd.) as a fiber reinforcing material.

Next, evaluation was carried out in the same manner as in Example 1. The results are shown in Table 1.

Example 8

A resin composition was obtained in the same manner as in Example 3, and then heated, pressed and molded at a molding temperature of 160° C., a molding pressure of 10 MPa and a molding time of 300 seconds to produce a molded article of Example 8, and evaluation was carried out in the same manner as in Example 1. The results are shown in Table 1.

Example 9

A resin composition was obtained in the same manner as in Example 3, and then heated, pressed and molded at a molding temperature of 120° C., a molding pressure of 10 MPa and a molding time of 180 seconds to produce a molded article of Example 9, and evaluation was carried out in the same manner as in Example 1. The results are shown in Table 1.

Comparative Example 1

A phenolic resin was produced by the following method.

In a reaction vessel, 1,000 g of phenol, 880 g of a 47% by mass formaldehyde aqueous solution and 10 g of sodium hydroxide as a catalyst were charged. Thereafter, the temperature was raised while stirring, and the reaction was carried out at a reflux temperature (around 100° C.) for 1 hour.

Then, the reaction solution was cooled to 50° C. and neutralized with paratoluenesulfonic acid. The reaction solution was dehydrated and concentrated under a reduced pressure of 70 mmHg to prepare a liquid resol-type phenolic resin having a nonvolatile content of 70% by mass.

The obtained phenolic resin had a number average molecular weight of 240 and a viscosity of 300 mPa·s (25° C.).

100 g of calcium carbonate as a filler, 5 g of magnesium oxide (amount of iodine adsorption of 20 mg/g) as a thickener and 3 g of zinc stearate (mold release agent) were added to 100 g of this phenolic resin. Thereafter, these were mixed in an experimental mixer to obtain a resin paste.

Next, the resin paste was applied onto a polyethylene film, and a glass chopped strand having a length of about 25 mm were further sprayed on the resin paste to prepare a sheet composed of the polyethylene film, the resin paste and the glass chopped strand.

Subsequently, a polyethylene film was laminated on the layer side containing the resin paste and the glass chopped strand in this sheet to prepare a laminated sheet having a three-layer structure composed of polyethylene film/resin paste and glass chopped strand/polyethylene film.

Thereafter, the laminated sheet was compressed by a roller to impregnate the glass chopped strand with the resin paste and to perform defoaming, thereby obtaining an SMC precursor. It should be noted that the glass chopped strand was blended so as to be contained in the SMC precursor (molding material) in an amount of 30% by mass.

Subsequently, the SMC precursor was aged and thickened at 40° C. for 60 hours, thereby obtaining an SMC having a viscosity of 5.6×10$^6$ mPa·s (40° C.).

The mass per unit area of the obtained SMC was 3.0 kg/m$^2$. It should be noted that the viscosity after the thickening treatment is a value obtained by measuring the viscosity of the resin paste treated under the same conditions as the aging condition of the SMC precursor with a B-type viscometer.

Further, joinability and deformation of the obtained SMC were evaluated in accordance with the above evaluation methods. In the evaluations of joinability and deformation, the SMC was used as a resin member. The results are shown in Table 2.

Comparative Example 2

A thermosetting resin composition of Comparative Example 2 was obtained by uniformly kneading, using a double arm type kneader, 18 parts by mass of a styrene monomer, 82 parts by mass of an unsaturated polyester resin A (product name: Rigolac (registered trademark) M-500D, manufactured by Showa Denko K.K.) having a styrene monomer content of 30% by mass, 10 parts by mass of polystyrene, 1 part by mass of TBPO as a curing agent, 50 parts by mass of calcium carbonate (product name: KS-1200A, average particle size: 1.2 μm, manufactured by Dowa Calfine Co., Ltd.) as a filler, 1 part by mass of magnesium oxide and 2 parts by mass of zinc stearate.

Next, a molded article of Comparative Example 2 was produced and evaluated in the same manner as in Example 1. The results are shown in Table 2.

Examples 1 to 9 were excellent in joinability when comparing Examples 1 to 9 and Comparative Examples 1 and 2.

In addition, when comparing Example 5 with Example 6, it was confirmed that there was no difference in joinability even when the residual amount of the styrene monomer in the cured product was changed when the unsaturated polyester resin B was used.

Further, when comparing Example 3 with Example 8, it was confirmed that when the residual amount of the styrene monomer in the cured product was less than 0.1% by mass, joinability was slightly lowered.

Furthermore, when comparing Example 3 with Example 9, it was confirmed that the cured product was deformed although the joinability was improved when the residual amount of the styrene monomer in the cured product exceeded 1% by mass.

TABLE 1

| | | | \multicolumn{9}{c}{Examples} | | | | | | | | |
|---|---|---|---|---|---|---|---|---|---|---|---|
| | | | 1 | 2 | 3 | 4 | 5 | 6 | 7 | 8 | 9 |
| Added amount of each component (parts by mass) | A | Styrene monomer | 40 | 40 | 18 | 20 | | | 18 | 18 | 18 |
| | | Ethylene glycol dimethacrylate | | | | 20 | | | | | |
| | B | Vinyl ester resin | 60 | | | 60 | | | | | |
| | | Unsaturated polyester resin A | | 60 | 82 | | | | 82 | 82 | 82 |
| | | Unsaturated polyester resin B | | | | | 100 | 100 | | | |
| | C | TBPO | 1 | 1 | 1 | 1 | | | 1 | 1 | 1 |
| | | Methyl ethyl peroxide | | | | | 1 | 1 | | | |
| | D | Carbon fiber | 100 | 100 | | 100 | | | | | |
| | | Glass fiber | | | 60 | | 60 | 60 | 60 | 60 | 60 |
| | | Polystyrene | | 10 | 10 | | | | 10 | 10 | 10 |
| | | Zinc stearate | 2 | 2 | 2 | 2 | | | 2 | 2 | 2 |
| | | Calcium carbonate | 15 | 15 | 50 | 15 | | | 50 | 50 | 50 |
| | | Magnesium oxide | 1 | 1 | 1 | 1 | | | 1 | 1 | 1 |
| | | 5% cobalt naphthenate | | | | | 0.1 | 0.1 | | | |
| Total of all components (parts by mass) | | | 229 | 229 | 224 | 229 | 161.1 | 161.1 | 174 | 224 | 224 |
| Residual amount of styrene monomer (% by mass) | | | 0.3 | 0.3 | 0.3 | 0.2 | 0.9 | 0.15 | 0.3 | 0.05 | 1.5 |
| Joinability evaluation | | | B | B | B | B | B | B | B | C | A |
| (MPa) | | | 5 | 5 | 5 | 4 | 8 | 4 | 5 | 2 | 10 |
| Deformation evaluation | | | Absent | Absent | Absent | Absent | Absent | Absent | Absent | Absent | Present |

TABLE 2

| | | | \multicolumn{2}{c}{Comparative Examples} | |
|---|---|---|---|---|
| | | | 1 | 2 |
| Added amount of each component (parts by mass) | A | Styrene monomer | | 18 |
| | | Ethylene glycol dimethacrylate | | |
| | B | Vinyl ester resin | | |
| | | Unsaturated polyester resin A | | 82 |
| | C | TBPO | | 1 |
| | D | Carbon fiber | | |
| | | Glass fiber | 90 | |
| | | Phenolic resin | 100 | |
| | | Polystyrene | | 10 |
| | | Zinc stearate | 3 | 2 |
| | | Calcium carbonate | 100 | 50 |
| | | Magnesium oxide | 3 | 1 |
| Total of all components (parts by mass) | | | 296 | 164 |
| Residual amount of styrene monomer (% by mass) | | | — | 0.4 |
| Joinability evaluation | | | D | D |
| (MPa) | | | 1> | Unmeasurable |
| Deformation evaluation | | | Absent | Present (cracks) |

From the results shown in Tables 1 and 2, it was confirmed that the thermosetting resin compositions of

INDUSTRIAL APPLICABILITY

The present invention provides a resin composition that can be efficiently joined, when formed into a thermosetting resin composite material, to a metal material by friction stir welding; a cured product thereof; and a friction stir welding method.

The present invention provides a resin composition and a cured product thereof capable of providing a thermosetting resin composite material having excellent mechanical strength and low temperature dependency and capable of efficiently joining the composite material and a metal material by friction stir welding; and a friction stir welding method using the cured product.

REFERENCE SIGNS LIST

1: Member
2: Cured resin material
3: Cylindrical tool
4: Protruding portion
5: Press-fit mark

The invention claimed is:

1. A friction stir welding method comprising:
   (i) preparing a cured product and a member to be joined to the cured product;
   (ii) bringing said cured product into contact with said member to form a contact portion; and
   (iii) pressing, while rotating, a cylindrical tool against at least a part of said member, and joining said cured product and the member by means of frictional heat due to friction and agitation,
   wherein said cured product is a cured product of a resin composition comprising: a monomer (A) having an ethylenically unsaturated bond, an unsaturated polyester resin or a vinyl ester resin (B), a radical polymerization initiator (C), and a fiber reinforcing material (D), and further comprising 0.0 to 10% by mass of a low profile agent with respect to a total amount of the composition, and
   wherein said member is a metal member.

2. The friction stir welding method according to claim 1, wherein said fiber reinforcing material (D) is a carbon fiber.

3. The friction stir welding method according to claim 1, wherein a residual amount of said monomer (A) having an ethylenically unsaturated bond which is remaining in an unreacted state in the cured product is from 0.1% by mass to 1% by mass with respect to the total amount of said resin composition.

4. The friction stir welding method according to claim 1, wherein in said resin composition,
   an amount of the monomer (A) having an ethylenically unsaturated bond is from 20% by mass to 80% by mass with respect to the total amount of the monomer (A) having an ethylenically unsaturated bond and the unsaturated polyester resin or the vinyl ester resin (B),
   an amount of the radical polymerization initiator (C) is from 0.1 parts by mass to 15 parts by mass with respect to a total of 100 parts by mass of the monomer (A) having an ethylenically unsaturated bond and the thermosetting resin (B), and
   an amount of the fiber reinforcing material (D) is from 5 parts by mass to 120 parts by mass with respect to a total of 100 parts by mass of the monomer (A) having an ethylenically unsaturated bond and the thermosetting resin (B).

5. The friction stir welding method according to claim 1, wherein said fiber reinforcing material (D) is a fiber cut to a length of 25 mm or less.

6. The friction stir welding method according to claim 1, wherein said fiber reinforcing material (D) is a glass mat or a glass cloth.

7. A structure obtained by joining said cured product and said member by the friction stir welding method according to claim 1.

8. The friction stir welding method according to claim 1, wherein the unsaturated polyester resin or the vinyl ester resin (B) consists of a vinyl ester resin.

9. The friction stir welding method according to claim 1, wherein the resin composition includes 0.0% by mass of the low profile agent with respect to the total amount of the composition.

10. The friction stir welding method according to claim 1, wherein the friction stir welding method includes the low profile agent, and
    the low profile agent is at least one selected from a group consisting of polystyrene, polymethyl methacrylate, polyvinyl acetate, saturated polyesters and styrene-butadiene rubber.

11. The friction stir welding method according to claim 1, wherein the cured product is a product which, after curing or after pressurizing and curing, has been subjected to post-curing at 60 to 120° C.

* * * * *